United States Patent [19]

Beukema et al.

[11] Patent Number: 4,783,110
[45] Date of Patent: Nov. 8, 1988

[54] CONSOLE MOUNTING SYSTEM

[75] Inventors: Jack A. Beukema; Robert L. Domke, both of Holland, Mich.

[73] Assignee: Prince Corporation, Holland, Mich.

[21] Appl. No.: 149,497

[22] Filed: Jan. 28, 1988

[51] Int. Cl.[4] .............................................. B60R 5/00
[52] U.S. Cl. ................................ 296/37.7; 293/128; 224/311; 224/42.42; 296/37.8
[58] Field of Search ...................... 296/37.7, 37.8; 224/42.42 R, 311; 248/221.4, 674; 293/128

[56] References Cited

U.S. PATENT DOCUMENTS

| Re. 32,165 | 6/1986 | Gerring | 29/401.1 |
|---|---|---|---|
| 1,187,700 | 6/1916 | Becker et al. | |
| 2,043,886 | 6/1936 | DeBoer | 206/19.5 |
| 2,435,151 | 1/1948 | Morgan | 206/19.5 |
| 3,773,378 | 11/1973 | Lewis | 296/37 |
| 3,856,194 | 12/1974 | Helm | 293/128 X |
| 4,079,987 | 3/1978 | Bumgardener | 296/37 |
| 4,101,159 | 7/1978 | Stewart | 296/37.7 |
| 4,241,870 | 12/1980 | Marcus | 296/37.7 |
| 4,441,641 | 4/1984 | Thompson | 296/37.7 X |
| 4,546,551 | 10/1985 | Franks | 33/356 |
| 4,674,789 | 6/1987 | Watjer et al. | 296/97 |

FOREIGN PATENT DOCUMENTS 159916 12/1979 Japan ............................ 296/37.7

Primary Examiner—Robert B. Reeves
Assistant Examiner—Brian Sells
Attorney, Agent, or Firm—Price, Heneveld, Cooper, DeWitt & Litton

[57] ABSTRACT

A universal mounting bracket for mounting vehicle accessories to a vehicle includes a U-shaped body having a downwardly extending tang projecting centrally from the base. The sides of the body include lateral, outwardly projecting flanges which extend in a longitudinal direction with respect to the vehicle when installed. A console is mounted to a vehicle using a pair of such universal mounting brackets. The console includes an upwardly extending first lip which rests upon the tang of one of a pair of spaced mounting brackets. A pair of inwardly projecting lips, spaced from the first lip, snap-fit over the lateral flanges which are sufficiently resilient to accommodate the snap-fitting of the console thereover.

23 Claims, 4 Drawing Sheets

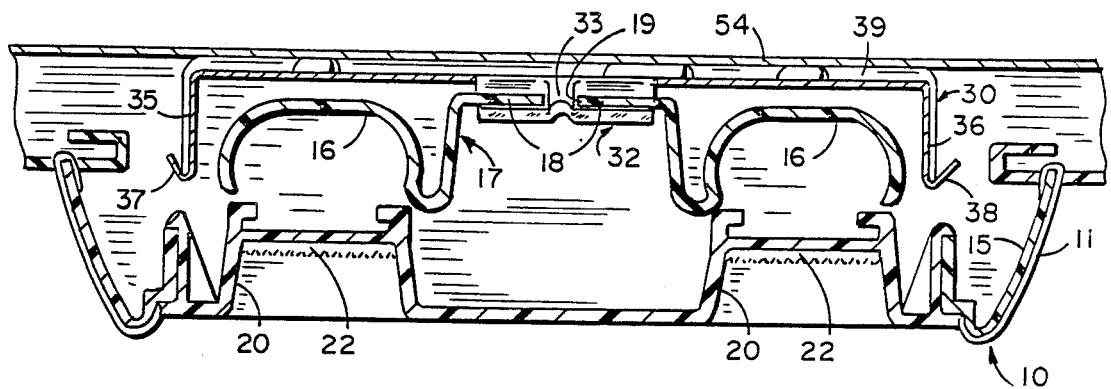
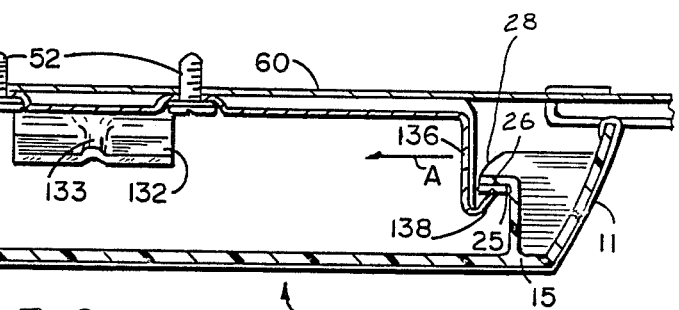
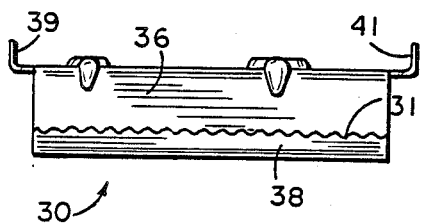
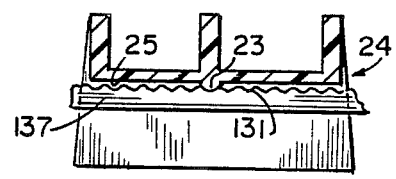
FIG. 5
FIG. 8
FIG. 9
FIG. 10

CONSOLE MOUNTING SYSTEM

BACKGROUND OF THE INVENTION

The present invention pertains to a console mounting system and particularly one employed for mounting an overhead console to the roof of a vehicle.

Overhead consoles are becoming increasingly popular in modern vehicles and contain a variety of vehicle accessories such as reading and courtesy lamps, storage compartments for sun glasses and other personal items; and electronic vehicle compasses of the type disclosed in U.S. Pat. No. 4,546,551. U.S. Pat. No. 4,674,789 issued on June 23, 1987, and assigned to the present assignee discloses one such console which includes these various features. The console disclosed in the above identified patent is secured to a beam in the vehicle by fastening bolts.

With the increased emphasis on productivity and efficiency in the manufacturing of vehicles, integral, pre-assembled subassemblies such as the overhead console disclosed in the above identified '789 patent are used more frequently. The utilization of conventional fasteners such as bolts or multiple fastening screws typically employed in the past for attaching overhead consoles to the vehicle as well as other structural elements within the vehicle interior reduces the assembly speed of the manufacturing process. Also, with finished parts, which in many cases are upholstered, the utilization of fastening devices such as screws which are rapidly inserted and tightened, can result in damage to the upholstery if the fastening tool slips from the fastner. In many cases, such an accident can puncture or otherwise scar the finished console or other vehicle accessory.

It is desired, therefore, to provide a system for mounting of finished vehicle accessories such as elongated overhead consoles to the vehicle during the assembly-line manufacturing process without the need for fasteners or the use of fastening tools particularly when the console is in its final upholstered form.

SUMMARY OF THE PRESENT INVENTION

The system of the present invention overcomes the deficiencies of the prior art by providing a universal mounting bracket which can be previously secured to the underlying sheet metal roof structure of the vehicle and subsequently a finished vehicle, such as a console, can be snap-fitted or otherwise interlocked onto one or more of such mounting brackets. In the preferred embodiment of the present invention, a relatively elongated console is secured to a pair of spaced universal mounting brackets. Each of the universal mounting brackets includes a generally U-shaped body having downwardly extending tang means projecting centrally from the base. The sides of the body include lateral, outwardly projecting flanges which extend in a longitudinal direction with respect to the vehicle when installed. In a preferred embodiment of the bracket, the edges of the flanges include gripping means such as teeth for inter-engaging a console or other vehicle accessory mounted to the bracket.

A console employed with such universal mounting brackets includes an upwardly extending first lip which rests upon the tang of one of a pair of spaced mounting brackets. A pair of inwardly projecting lips, spaced from the first lip, snap-fit over the lateral flanges which are sufficiently resilient to accommodate the snap-fitting of the console thereover. The edges of the pair of lips may include one or more teeth-engaging ribs to interlock the console to the bracket. By providing the universal bracket with both the outwardly projecting flanges along its outer edges and extending longitudinally as well as a rearwardly projecting tang, a single bracket can serve to accommodate the two different mounting methods and provide a quick and easily installed system for mounting vehicle accessories such as a console.

With the present invention, therefore, a finished console can be quickly and easily mounted to the roof of a vehicle without damage by first inserting the forwardly projecting lip of the console over the tang of the forwardmost bracket and subsequently raising and snap-fitting the rear of the console over the outwardly projecting flanges on the rearmost bracket to complete the console installation.

With the system of the present invention, therefore, no fastening tools are necessary for installation of a final upholstered console, and therefore, minimum or no risk or injury to the console occurs during its final installation. The universal mounting brackets can be conventionally attached to the suitable sheet metal structure of the roof prior to installation of the vehicle headliner to also minimize any possible damage to the vehicle headliner as well. These and other features, objects, and advantages of the present invention will become apparent upon reading the following description thereof together with reference to the accompanying drawings in which:

BRIEF DESCRIPTION OF THE DRAWINGS

FIG. 5 is a fragmentary cross-sectional view of the console and mounting bracket taken along section lines V—V of FIG. 3 and also shown mounted to the roof of a vehicle;

FIG. 8 is a cross-sectional view of the mounting bracket and console taken along section lines VIII—VIII of FIG. 6 and also shown mounted to the roof of a vehicle;

FIG. 9 is a side elevational view of the mounting bracket, shown in previous Figures; and FIG. 10 is an enlarged, fragmentary, cross-sectional view of the bracket and console inter-connection of FIG. 6 taken along section lines X—X of FIG. 6.

DETAILED DESCRIPTION OF THE PREFERRED EMBODIMENT

Figure 1:
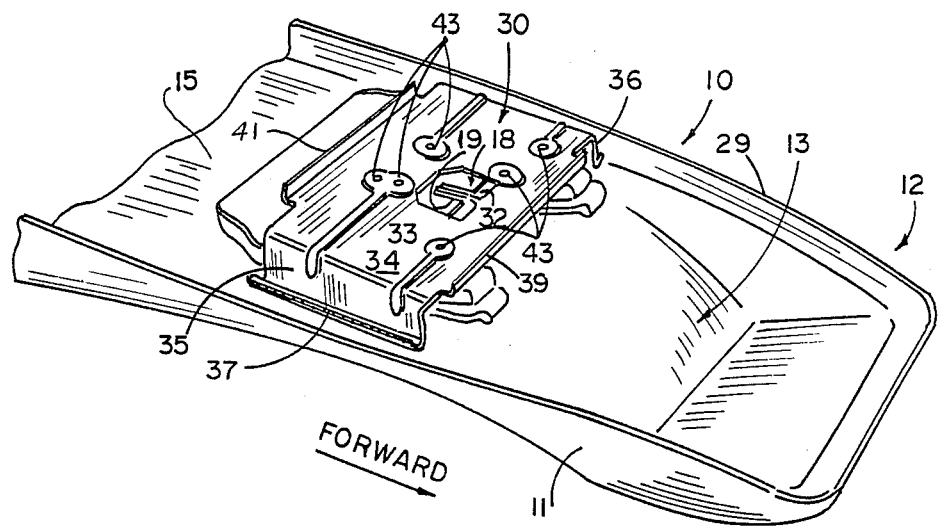
FIG. 1 is a fragmentary perspective view of the top of a console shown mounted to a forward mounting bracket of the system of the present invention.
Figure 2:
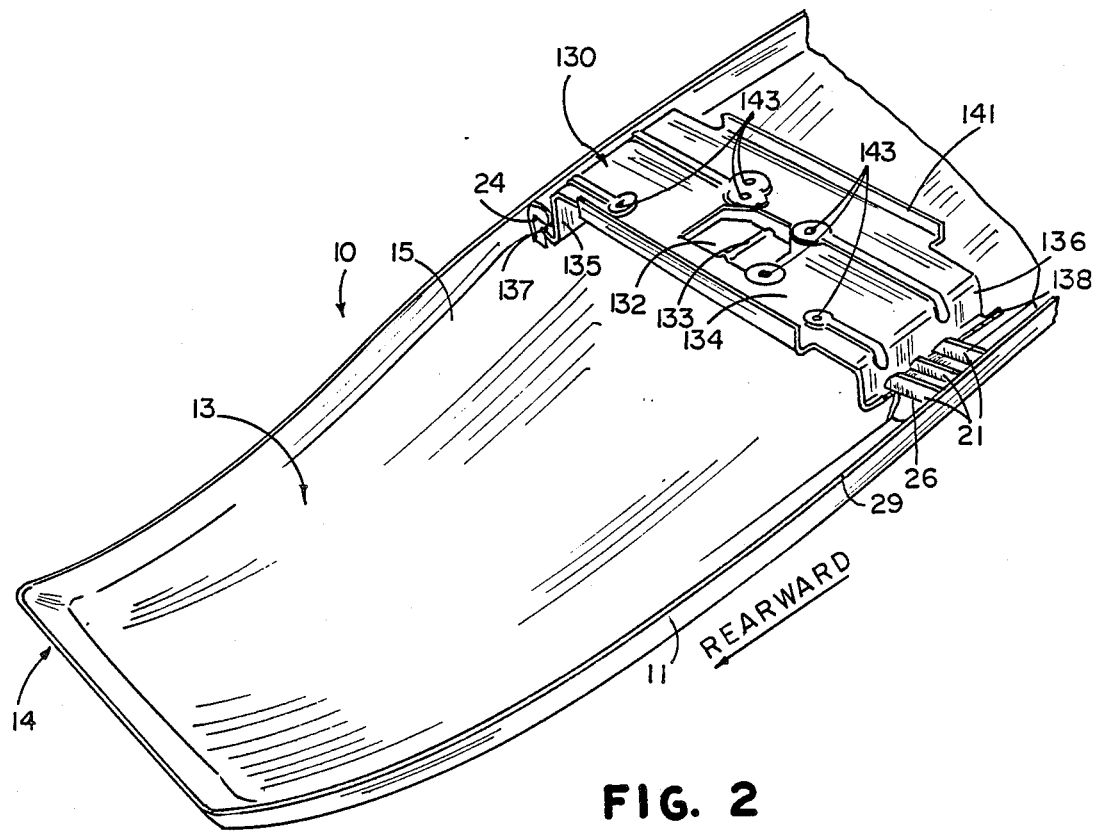
FIG. 2 is a fragmentary perspective view of the rear of the console shown in FIG. 1 showing a rear mounting bracket and associated console mounting structure.

Referring initially to FIGS. 1 and 2, a vehicle overhead console 10 embodying the present invention is shown and which may include several of the accessories previously mentioned and which are generally disclosed in U.S. Pat. No. 4,674,789. For the sake of clarity, most of the various electronic and other mechanical components are not illustrated in FIGS. 1 and 2 so that the mounting structure can be more clearly shown, it being understood that such structure occupies the interior of the generally concave body 15 of the integrally molded console 10. Console 10 may be molded of any suitable polymeric material or otherwise formed or stamped from sheet metal or the like and subsequently covered with an upholstery material 11 to conform the console to the interior of a vehicle. The forward portion 12 of the console typically will extend closely adjacent the vehicle windshield while the rear 14, shown in FIG. 2, may include a stop-light assembly which is positioned near the rear window of the vehicle and centrally thereof. The console body 15 is generally concave to provide space 13 to hold the various vehicle accessories such as an electronic compass system near the front end, map lamps associated with housing 16 (FIG. 5) near the center, and storage compartments or the like near the rear.

Figure 3:
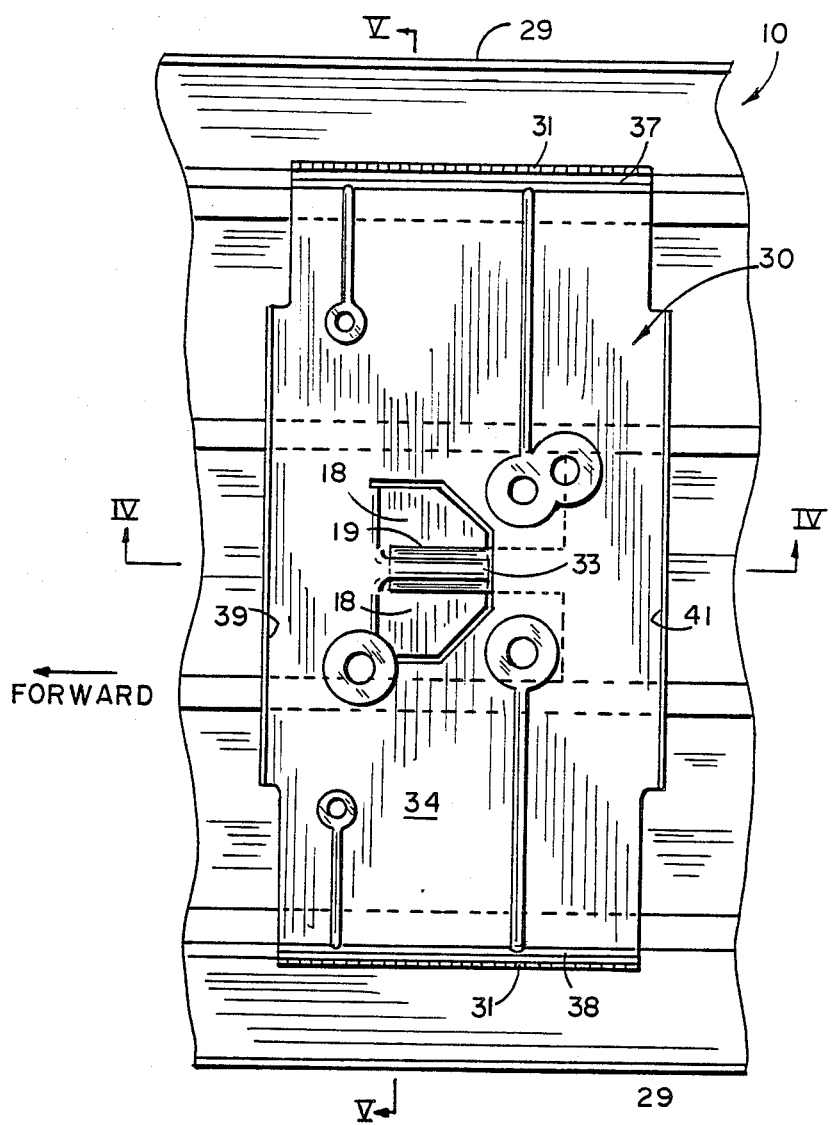
FIG. 3 is a framentary, enlarged top plan view of the forward mounting bracket and console area shown in FIG. 1.
Figure 4:
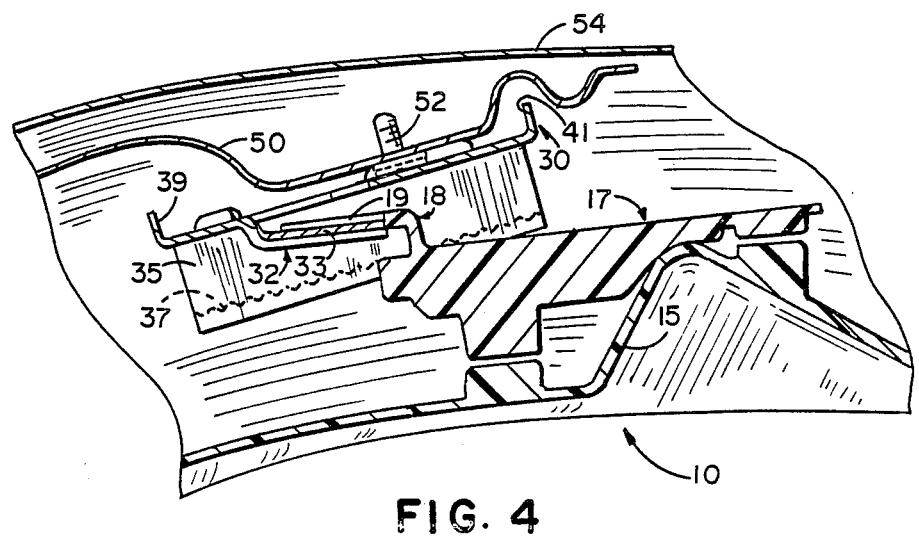
FIG. 4 is a fragmentary cross-sectional view of the console and forward mounting bracket taken along section lines IV—IV of FIG. 3 and also shown mounted to the roof of a vehicle.

The console body 15 includes, as best seen in FIGS. 4 and 5, a mounting boss 17 which can be integral with or conventionally secured to console body 15 and which has an upwardly and forwardly projecting, L-shaped, split lip 18 which is centrally positioned within the console for alignment with the forward one of the identical mounting brackets 30. Specifically, the lip 18 aligns with a downwardly and rearwardly projecting tank 32 integrally formed in the steel mounting bracket 30 as best seen in FIGS. 3–5. As seen in FIG. 4 and 5, lip 18 on console 10 is split and includes a central longitudinally extending slot 19 which is aligned within and receives a convex, longitudinally extending ridge 33 formed in tang 32, as best seen in FIG. 5.

Figure 7:
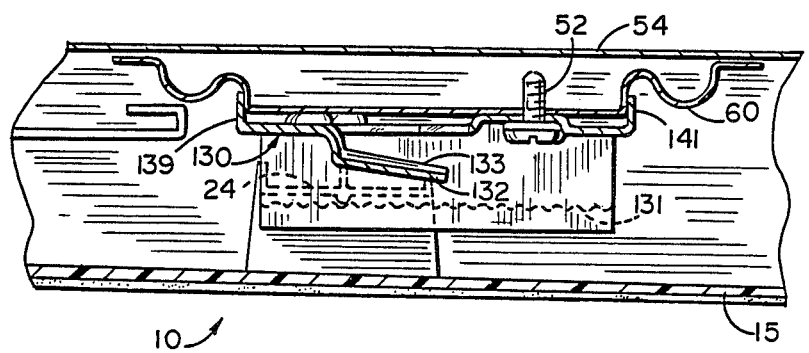
FIG. 7 is a fragmentary cross-sectional view of the mounting bracket shown in FIG. 6 taken along section lines VII—VII of FIG. 6 and also shown mounted to the roof of a vehicle.

Each of the universal mounting brackets are generally U-shaped in cross section, inverted when installed, as best seen in FIGS. 5 and 8, and include a generally horizontally and substantially flat base plate 34 with a pair of downwardly projecting sides 35 and 36 terminating in outwardly and somewhat upwardly projecting flanges 37 and 38. Each of the flanges 37 and 38 terminate in edges with console gripping means comprising a plurality of teeth 31, as best seen in FIGS. 9 and 10. These teeth engage the troughs 25 of the pair of console lips 24 and 26, as seen in FIGS. 8 and 10, and lockably engage a rib 23 in each of the troughs, as best seen in FIG. 10. The forward and rear edge of plate 34 also include upwardly turned edges 39 and 41, respectively, which may be employed for centering the bracket on a cross beam of the vehicle as seen, for example, in FIG. 7. Plate 34 also includes a plurality of apertures 43 spaced at various locations for receiving fastening screws 52 for attachment of the mounting brackets to a sheet metal structural member such as structural member 50 of the vehicle roof 54, as seen in FIGS. 4 and 7.

In the preferred embodiment of the console shown in the Figures, the console mounting boss 17 integrally includes, as best seen in FIG. 5, lamp housings 16, while body 15 of the console includes lens receiving sockets 20 for receiving lenses 22 therein for map reading and courtesy lamps positioned in the forward portion of the console below and forward of the universal mounting bracket 30 shown in FIGS. 1 and 3–5. The rear mounting bracket shown in FIGS. 2 and 6–8 is identical to the forward mounting bracket and is identified by the reference numeral 130. Thus, the second two digits of each of the reference numerals on the rear mounting bracket will be the same as the identical corresponding structure of the forward mounting bracket 30. The rear mounting bracket, like the forward mounting bracket, is secured to a sheet metal member 60 of the vehicle roof 54 by suitable fastening means such as sheet metal screws 52 as seen in FIG. 7. Alternatively brackets 30 and 130 could be spot welded to the vehicle roof members.

The body 15 of console 10 includes toward its rearward end a pair of inwardly projecting integrally molded lips 24 and 26 as best seen in FIGS. 2 and 8 with each lip including a downwardly projecting edge 27 which, as best seen in FIG. 8, extends into the V-shaped trough defined by the outwardly and upwardly projecting ends 137 and 138, respectively, of the side legs 135 and 136 of bracket 130. The inverted trough 25 of each of the lips 24 and 26 include at least one rib 23 (FIG. 10) extending across (i.e. laterally) the trough to engage the teeth 131 (FIG. 10) of bracket 130 and interlock the console against fore and aft movement once installed and yet allow easy removal of the console as described below.

Figure 6:
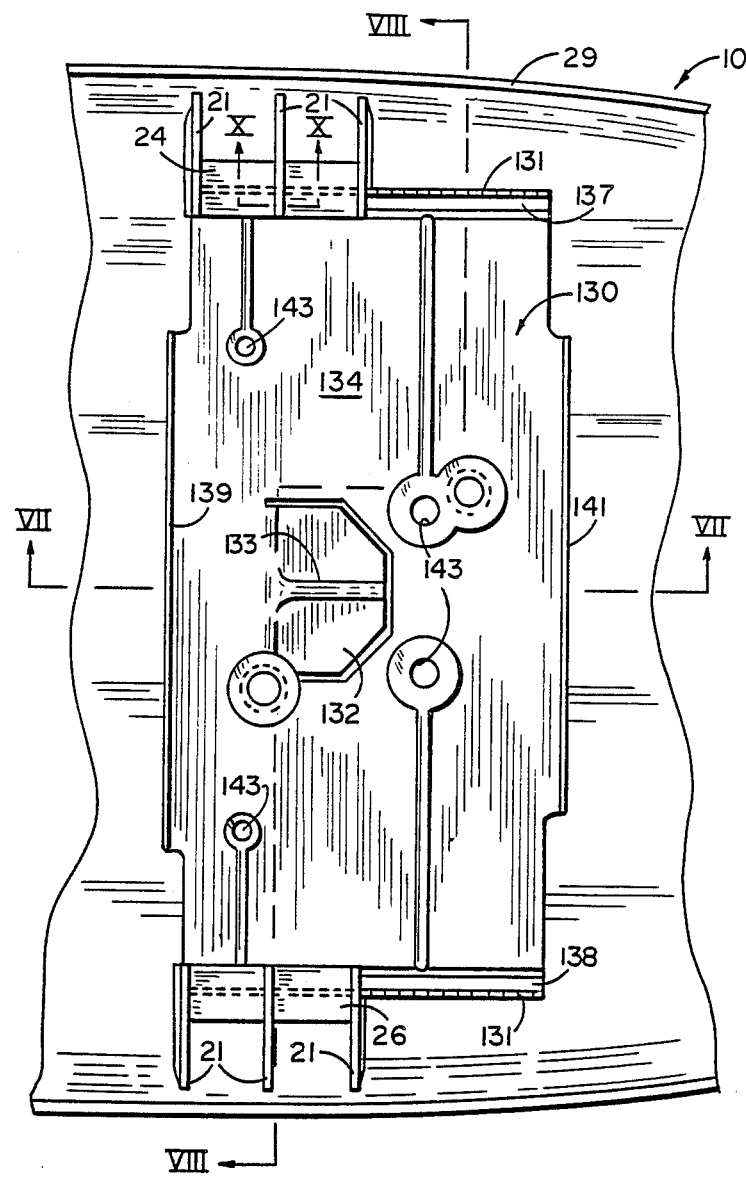
FIG. 6 is a fragmentary, enlarged top plan view of the rear mounting bracket and console area shown in FIG. 2.

The sides 135 and 136 of the steel bracket 130 are sufficiently resilient to allow them to deflect inwardly as indicated by arrows A in FIG. 8 as the console is installed by pushing the console upwardly so that the tapered camming surfaces 28 on each of the lips 24 and 26 will deflect the downwardly projecting sides of the mounting bracket inwardly sufficiently to allow clearance of the flange over the lips and subsequently spring outwardly to the locking position shown in FIGS. 2 and 8. As best seen in FIGS. 2 and 6, the inwardly projecting lip assemblies 24 and 26 of the console are relatively sturdy and are reinforced by three integrally molded ribs 21 to assure that there is sufficient rigidity for securely holding the rear of the console onto the flanges of the mounting bracket 130.

Thus, it is seen that with the identical universal mounting brackets 30 and 130 of the present invention, the forward bracket employs only the downwardly and rearwardly projecting mounting tang 32 while the rear mounting bracket only employs the outwardly projecting sides 135 and 136 for their respective mounting functions. This installation arrangement could be reversed, although it is preferable to mount the forward end to the vehicle through the interlocking tang and lip 32 and 18, respectively, since the electrical connections take place in this area.

Installation of the completed console 10 is achieved once brackets 30 and 130 are secured to the vehicle roof by inserting the slot 19 of the upwardly and forwardly projecting lip 18 of the console 10 over tank 32 to receive the central locating ridge 33 thereof and connecting the electrical connectors together and subsequently raising the rear of the console until the lips 24 and 26 snap-fit within the flanges 135 and 136 of the rear bracket. The padded headliner will compress against the upper peripheral ridge 29 (FIG. 1 and 2) of console 10 which, together with the weight of the console, forces the teeth 131 of the flanges 137 and 138 of bracket 130 into troughs 25 of lips 24 and 26. The rib 23 of each of the troughs 25 will interlock between a pair of the teeth 131, as best seen in FIG. 10, while the tips of the remaining teeth contact the floor of the inverted trough (FIG. 8). This contact prevents the console from moving fore and aft once installed. If at a later time it is necessary to remove the console, for repair of a component, for example, it is necessary only to push the rear 14 (FIG. 2) of the console upwardly to disengage the teeth and slide the console rearwardly until lip 18 disengages tang 32. As seen in FIGS. 2 and 6, the longitudinal length of lips 24 and 26 is substantially less than that of bracket 130. This allows the console to be slipped forwardly or rearwardly off of the rear bracket 130 once the forward mount is disengaged.

Thus, with the system of the present invention, a completed vehicle accessory, such as a console which is upholstered, can be easily mounted to a pair of spaced universal mounting brackets with different mounting actions taking place to facilitate such installation. The forward end of the console can be positioned and the electrical connection made and the console swung-up and snap-fitted into place. Positive interlocking means are provided to prevent shifting of the console and yet allow easy removal. The mounting system minimizes the time required for installation of the console and minimizes any possible damage to the console during the installation process since no fasteners or fastening tools are employed.

It will become apparent to those skilled in the art that various modifications to the preferred embodiment of the invention described herein can be made without departing from the spirit or scope thereof as defined by the appended claims.

The embodiments of the invention in which an exclusive property or privilege is claimed are defined as follows:

We claim:

1. A mounting bracket for mounting vehicle accessories to a vehicle, said mounting bracket accommodating at least two different mounting techniques, said bracket comprising:
   a base including means for securing said base to a vehicle structural member, said base including a tang extending downwardly therefrom to define a support surface for receiving a vehicle accessory, said bracket further including a pair of sides integral with said base to define a U-shaped member, said sides including laterally extending flanges extending longitudinally on opposite outer ends of said sides, said sides being sufficiently resilient to allow the vehicle accessory to deflect the flanges for snap-fitting of vehicle accessory therein.

2. The mounting bracket as defined in claim 1 wherein said tang includes a centrally extending longitudinal ridge for centering the vehicle accessory with respect to said tang.

3. The mounting bracket as defined in claim 2 wherein said flanges each include an edge with gripping means.

4. The mounting bracket as defined in claim 3 wherein said gripping means comprises a plurality of teeth for engaging and holding a vehicle accessory in longitudinal relationship with respect to said mounting bracket.

5. The mounting bracket as defined in claim 4 wherein said securing means includes a pair of lips extending along edges of said base adjacent said sides and extending in a direction opposite said sides.

6. The mounting bracket as defined in claim 5 wherein said mounting means further includes aperture means for attaching said mounting bracket to a vehicle.

7. The vehicle console and mounting bracket system comprising:
   a pair of spaced mounting brackets each bracket including a base having means for securing said base to a vehihcle structural member, said base including a central tang extending downwardly therefrom defining a generally horizontally extending ledge; said mounting bracket further including a pair of sides extending from said base with laterally extending flanges extending longitudinally on opposite outer edges thereof, said sides sufficiently resilient to allow deflection for snap-fitting of the console thereon; and
   a vehicle console having a first lip at a forward portion thereof for resting upon said tang and a pair of inwardly projecting lips located rearwardly thereof and in alignment with one of said mounting brackets for snap-fitting over said flanges thereof for mounting said console to said mounting brackets.

8. The system as defined in claim 7 wherein said tang includes a centrally extending longitudinal ridge for centering said console.

9. The system as defined in claim 8 wherein said first lip includes a slot therein for receiving said ridge of said tang.

10. The system as defined in claim 9 wherein said flanges include gripping means along edges remote from said sides.

11. The system as defined in claim 10 wherein said gripping means comprises a plurality of teeth.

12. The system as defined in claim 11 wherein said pair of lips on said console define trough means for receiving said teeth of said mounting bracket.

13. The system as defined in claim 12 wherein said trough includes at least one lateral rib for interlocking with said teeth to prevent movement of said console once installed.

14. The system as defined in claim 13 wherein said means for securing said base includes a pair of lips extending along edges of said base adjacent said sides and extending in a direction opposite said sides.

15. A vehicle accessory and mounting bracket system comprising:
   a pair of spaced mounting brackets each bracket including a base having means for securing said base to a vehicle structural member, said base including a central tang extending downwardly therefrom defining a generally horizontally extending ledge; said mounting bracket further including a pair of sides extending from said base with laterally extending flanges extending longitudinally on opposite outer edges thereof, said sides sufficiently resilient to allow deflection for snap-fitting of the accessory thereon; and
   a vehicle accessory having a first lip at a forward portion thereof for resting upon said tang and a pair of inwardly projecting lips located rearwardly thereof and in alignment with one of said mounting brackets for snap-fitting over said flanges thereof for mounting said accessory to said mounting brackets.

16. The system as defined in claim 15 wherein said tang includes a centrally extending longitudinal ridge for centering said accessory.

17. The system as defined in claim 16 wherein said first lip includes a slot therein for receiving said ridge of said tang.

18. The system as defined in claim 17 wherein said flanges include gripping means along edges remote from said sides.

19. The system as defined in claim 18 wherein said gripping means comprises a plurality of teeth.

20. The system as defined in claim 19 wherein said pair of lips on said accessory define trough means for receiving said teeth of said mounting bracket.

21. The system as defined in claim 20 wherein said trough includes at least one lateral rib for interlocking with said teeth to prevent movement of said accessory once installed.

22. The system as defined in claim 21 wherein said means for securing said base includes a pair of lips extending along edges of said base adjacent said sides and extending in a direction opposite said sides.

23. A vehicle console and mounting bracket combination comprising:
- a pair of U-shaped mounting brackets mounted to a vehicle roof in spaced relationship wherein each bracket includes a base including a central, downwardly extending tang, defining a generally horizontally extending ledge for receiving said console, said mounting bracket further including a pair of sides each including laterally extending flanges extending longitudinally on opposite outer edges thereof; said sides being sufficiently resilient to allow said console to deflect the flanges for snap-fitting thereon; and
- a vehicle console having a first lip at the forward portion thereof for resting upon said tang of one of said mounting brackets and a pair of inwardly projecting lip members located rearwardly thereof and in alignment with the other of said mounting brackets for snap-fitting over said flanges thereof for mounting said console to the vehicle without tools.

\* \* \* \* \*